United States Patent
Suzuki et al.

(10) Patent No.: US 7,614,467 B2
(45) Date of Patent: Nov. 10, 2009

(54) IN-WHEEL MOTOR SYSTEM HAVING DAMPING MECHANISM

(75) Inventors: Yasuhiro Suzuki, Tokyo (JP); Katsumi Tashiro, Tokyo (JP); Yoshinari Nakamura, Tokyo (JP)

(73) Assignees: Kabushiki Kaisha Bridgestone, Tokyo (JP); Kayaba Industry Co., Ltd., Tokyo (JP)

( * ) Notice: Subject to any disclaimer, the term of this patent is extended or adjusted under 35 U.S.C. 154(b) by 573 days.

(21) Appl. No.: 10/583,848

(22) PCT Filed: Dec. 22, 2004

(86) PCT No.: PCT/JP2004/019243

§ 371 (c)(1),
(2), (4) Date: Jun. 21, 2006

(87) PCT Pub. No.: WO2005/061258

PCT Pub. Date: Jul. 7, 2005

(65) Prior Publication Data

US 2007/0169972 A1  Jul. 26, 2007

(30) Foreign Application Priority Data

Dec. 22, 2003 (JP) .............................. 2003-425683

(51) Int. Cl.
*B60K 1/00* (2006.01)
(52) U.S. Cl. .................................. 180/65.51; 180/65.1
(58) Field of Classification Search ................ 180/65.1, 180/65.51, 220
See application file for complete search history.

(56) References Cited

U.S. PATENT DOCUMENTS

| | | | | |
|---|---|---|---|---|
| 1,321,898 A | * | 11/1919 | Dey | 74/410 |
| 2,155,521 A | * | 4/1939 | Zavarella | 280/124.127 |
| 2,537,479 A | * | 1/1951 | Motte | 180/385 |

(Continued)

FOREIGN PATENT DOCUMENTS

EP 1 380 459 A1 1/2004

(Continued)

OTHER PUBLICATIONS

CD-ROM of the specification and drawings annexed to the request of Japanese Utility Model Application No. 14243/1991 (Laid-Open No. 3650/1993) (Mitsubishi Electric Corp.), Jan. 19, 1993, Full text; Figs. 1 to 3 (Family: none).

*Primary Examiner*—Christopher P Ellis
*Assistant Examiner*—Vaughn T Coolman
(74) *Attorney, Agent, or Firm*—Sughrue Mion, PLLC

(57) ABSTRACT

An in-wheel motor system, wherein the non-rotating side case of a motor and the knuckle of a motor are connected to each other by a buffer mechanism 10 having plates 11 and 12 interconnected by a linear guide 15 with springs composed of a linear guide 13 consisting of a linear bearing 13A and a rod 13B and spring members 14 and 14 moving in the vertical direction of a vehicle and integrated with the linear guide 13 and a damper 16 moving in the vertical direction of the vehicle and interconnecting the plates 11 and 12. Thus, the motor can be securely float mounted to a part around the wheel of the vehicle and the buffer mechanism 10 can be easily assembled.

3 Claims, 4 Drawing Sheets

U.S. PATENT DOCUMENTS

| | | | | |
|---|---|---|---|---|
| 3,792,742 A | * | 2/1974 | Mager | 180/65.51 |
| 4,991,698 A | * | 2/1991 | Hanson | 188/380 |
| 5,087,229 A | * | 2/1992 | Hewko et al. | 475/149 |
| 6,170,242 B1 | * | 1/2001 | Gordon | 56/15.8 |
| 6,510,678 B2 | * | 1/2003 | Ferris et al. | 56/15.8 |
| 7,287,611 B2 | * | 10/2007 | Nagaya | 180/65.51 |
| 7,306,065 B2 | * | 12/2007 | Nagaya | 180/65.51 |
| 2004/0099455 A1 | * | 5/2004 | Nagaya | 180/65.5 |
| 2005/0247496 A1 | * | 11/2005 | Nagaya | 180/65.5 |

FOREIGN PATENT DOCUMENTS

| | | |
|---|---|---|
| JP | 2001-507242 A | 6/2001 |
| WO | WO 02/083446 A1 | 10/2002 |

\* cited by examiner

IN-WHEEL MOTOR SYSTEM HAVING DAMPING MECHANISM

BACKGROUND OF THE INVENTION

1. Field of the Invention

The present invention relates to an in-wheel motor system for use in a vehicle having direct drive wheels as drive wheels.

2. Description of the Prior Art

It is generally known that, in a vehicle having a suspension mechanism such as a spring around a wheel, as the mass of parts under the spring such as a wheel, knuckle and suspension arm, so-called "unsprung mass" increases, changes in the ground holding force of a tire when running on an uneven road become larger, thereby deteriorating road holding properties.

In a vehicle driven by a motor such as an electric car, an in-wheel motor system incorporating a motor in a wheel is being employed. However, in a conventional in-wheel motor which is fixed to a spindle shaft connected to a part such as an upright or knuckle which is one of the parts around a wheel of the vehicle, the above unsprung mass increases by the weight of the in-wheel motor, whereby changes in the ground holding force of the tire become large, thereby deteriorating road holding properties (refer to patent documents 1 to 3, for example).

To solve the above problem, there is proposed an in-wheel motor system as shown in FIG. 4 in which a non-rotating side case 3a supporting a stator 3S elastically supported to a knuckle 5 by a buffer mechanism 50 having two plates 54 and 55 whose moving directions are limited to the vertical direction of the vehicle by direct-acting guides 51 and which are interconnected by springs 52 and a damper 53 moving in the vertical direction of the vehicle and a rotating side case 3b supporting a rotor 3R and a wheel 2 are interconnected by a flexible coupling 60 comprising a plurality of hollow disk-like plates 61A to 61C which are interconnected by direct-acting guides 62A and 62B arranged in such a manner that their moving directions are orthogonal to each other (refer to patent document 4, for example).

More specifically, as shown in FIG. 5, the above buffer mechanism 50 is connected to an axle 6 connected to the knuckle 5, four springs 52 which expand and contract in the vertical direction of the vehicle are installed in the four corners of a knuckle attachment plate 55 positioned on the suspension member 7 side, two dampers 53 which expand and contract in the vertical direction of the vehicle are mounted on both sides of a connection hole 55h for the axle 6 formed in the center of the knuckle attachment plate 55, spring receivers 52n are installed at positions corresponding to positions above or below the above springs 52 of a motor attachment plate 54 positioned on the motor 3 side, damper attachment portions 53n are mounted at positions corresponding to positions above the dampers 53, and the above plates 54 and 55 are interconnected by four direct-acting guides 51 which are arranged symmetrical to the center of the plates. Thereby, the motor attachment plate 54 and the knuckle attachment plate 55 are guided in the vertical direction of the vehicle by the above four direct-acting guides 51 and interconnected by the springs 52 and the dampers 53, thereby making it possible to limit the movement of the in-wheel motor 3 to the vertical direction while attenuation force is generated.

In the in-wheel motor system constituted as described above, the in-wheel motor 3 is float mounted to a part around the wheel so that the motor 3 itself can be used as the weight of a dynamic damper, thereby making it possible to improve ground holding performance and riding comfort when running on a bad road. Since the motor shaft and the wheel shaft are interconnected by the above flexible coupling 60 in such a manner that they can become eccentric to each other in any direction, torque can be transmitted from the motor 3 to the wheel 2 efficiently.

Patent document 1: Japanese Patent No. 2676025

Patent document 2: Japanese Examined Patent Publication No. 9-506236

Patent document 3: Japanese Unexamined Patent Application No. 10-305735

Patent document 4: WO 02/083446 A1

SUMMARY OF THE INVENTION

Although the above buffer mechanism 50 can float mount the motor 3 to a part around the wheel of the vehicle without fail, it has a large number of parts and requires high assembly accuracy because four direct-acting guides 51 and springs 52 must be mounted in parallel to each other in the vertical direction. Therefore, it takes long to assemble the buffer mechanism 50.

It is an object of the present invention which has been made in view of the above problem of the prior art to provide an in-wheel motor system comprising a buffer mechanism which can float mount the motor to a part around the wheel of a vehicle without fail and is easily assembled.

According to a first aspect of the present invention, there is provided an in-wheel motor system having a hollow direct drive motor which is provided in a wheel and whose stator side is supported to a part around the wheel of a vehicle by elastic bodies and/or an attenuation mechanism, wherein the non-rotating side case of the above motor is supported to the part around the wheel of the vehicle by a buffer mechanism which comprises a direct-acting guide with springs composed of a direct-acting guide consisting of a linear bearing and a rod and spring members integrated with the direct-acting guide, two plates interconnected by this direct-acting guide with springs in such a manner that their moving directions are limited to the vertical direction of the vehicle, and a damper for interconnecting the two plates, moving in the vertical direction of the vehicle.

According to a second aspect of the present invention, there is provided an in-wheel motor system, wherein a fixing member for attaching the linear bearing as the fixing portion of the direct-acting guide is mounted on a knuckle attachment plate connected to a knuckle, receiving members for attaching both ends of the rod as the movable portion of the direct-acting guide are mounted on a motor attachment plate connected to the non-rotating side case of the motor, the fixing portion and the movable portion of the direct-acting guide are attached to the knuckle attachment plate and the motor attachment plate, respectively, and the spring members are interposed between the fixing member and the receiving member.

According to a third aspect of the present invention, there is provided an in-wheel motor system, wherein the spring members are arranged on the outer sides of the rod.

According to the present invention, since the non-rotating side case of the motor and the knuckle are interconnected by a buffer mechanism comprising two plates which are interconnected by a direct-acting guide with springs composed of a direct-acting guide consisting of a linear bearing and a rod and spring members integrated with the direct-acting guide and whose moving directions are limited to the vertical direction of the vehicle and a damper moving in the vertical direction of the vehicle, simple in structure and having a small number of parts, the in-wheel motor is float mounted to the part around the wheel of the vehicle and used as the weight of a dynamic damper, thereby making it possible to improve ground holding performance and riding comfort at the time of running a bad road and to carry out the assembly work of the buffer mechanism easily and efficiently.

DETAILED DESCRIPTION OF THE PREFERRED EMBODIMENT

A preferred embodiment of the present invention will be described hereinunder with reference to the accompanying drawings.

Figure 1:
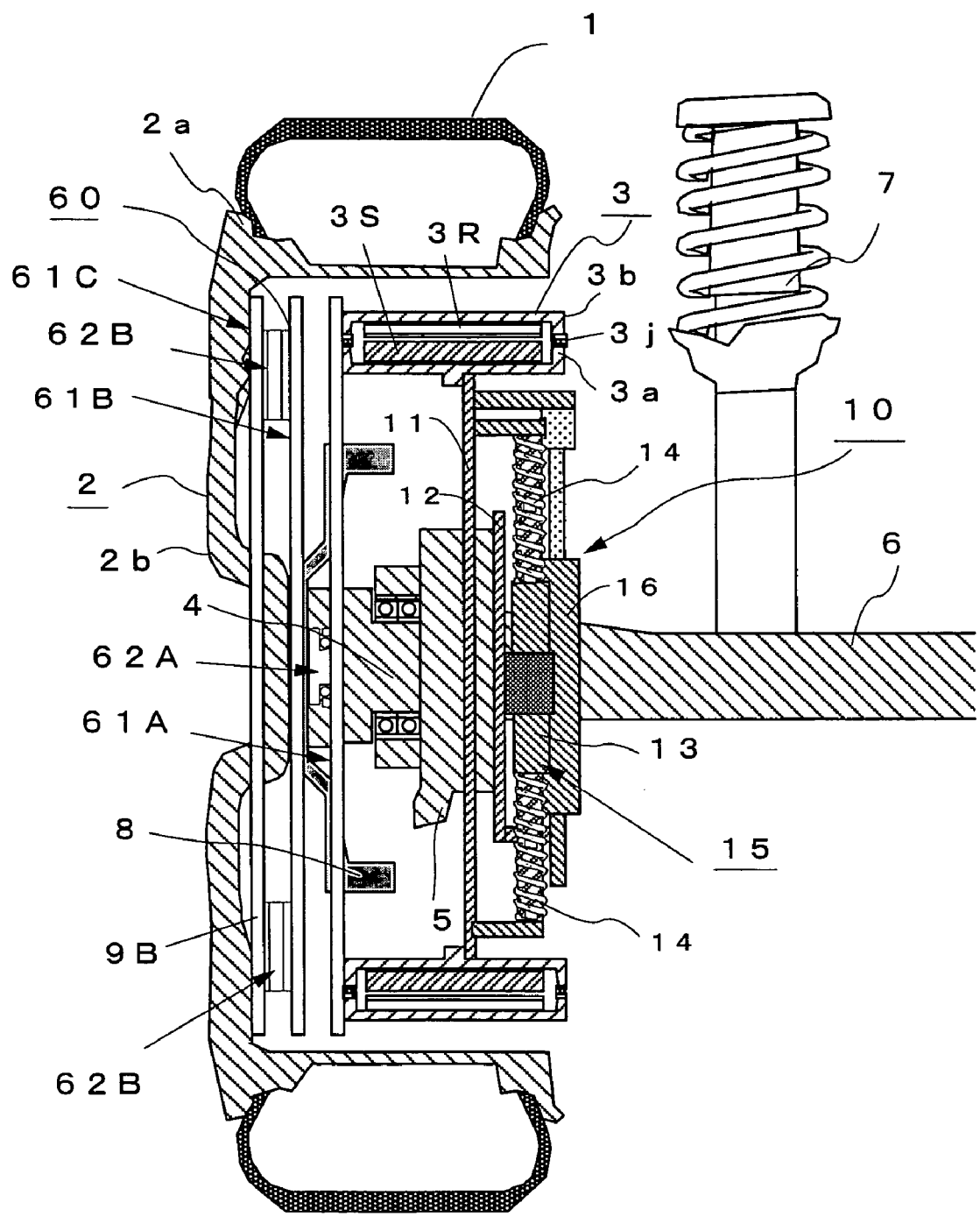
FIG. 1 is a longitudinal sectional view showing the constitution of an in-wheel motor system according to a preferred embodiment of the present invention.

FIG. 1 shows the constitution of an in-wheel motor system according to a preferred embodiment of the present invention. In FIG. 1, reference numeral 1 denotes a tire, 2 a wheel consisting of a rim 2a and a wheel disk 2b, and 3 an outer rotor type in-wheel motor which comprises a stator 3S fixed to a non-rotating side case 3a arranged on the inner side in the radial direction and a rotor 3R fixed to a rotating side case 3b rotatably connected to the above non-rotating side case 3a through a bearing 3j and arranged on the outer side in the radial direction.

Numeral 4 denotes a hub connected to the wheel 2 at its rotary shaft, 5 a knuckle connected to an axle 6, 7 a suspension member composed of a shock absorber, 8 a brake unit composed of a brake disk mounted to the above hub 4, 10 a buffer mechanism for connecting the non-rotating side case 3a of the motor to the knuckle 5, comprising a motor attachment plate 11 connected to the non-rotating side case 3a of the motor 3, a knuckle attachment plate 12 attached to the above axle 6, a direct-acting guide member 15 with springs composed of a direct-acting guide member 13 for guiding the above motor attachment plate 11 and the above knuckle attachment plate 12 in the vertical direction of the vehicle and spring members 14 which expand and contract in the moving direction of the above direct-acting guide member 13 and are integrated with the direct-acting guide member 13, and a damper 16 which expands and contracts in the moving direction of the above direct-acting guide 15 with springs, and 60 a flexible coupling for connecting the rotating side case 3b of the above motor 3 to the wheel 2, comprising a plurality of hollow disk-like plates 61A to 61C interconnected by direct-acting guides 62A and 62B arranged in such a manner that their moving directions are orthogonal to each other.

Figure 2:
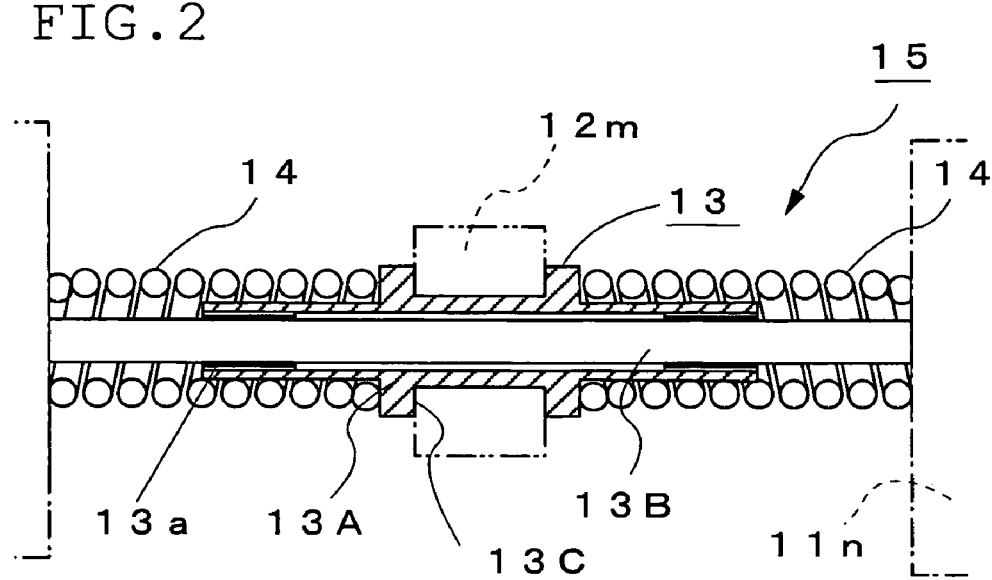
FIG. 2 is a diagram showing the constitution of a direct-acting guide with springs according to the preferred embodiment.

As shown in FIG. 2, the direct-acting guide 15 with springs is composed of the direct-guide member 13 which consists of a linear bearing 13A having two linear ball bearings 13a and 13a connected in series and arranged on the inner side and a rod 13B which moves linearly and is mated with the linear bearing 13A and the spring members 14 and 14 arranged on the outer sides of the above rod 13B of the direct-acting guide member 13, and an attachment groove 13C for fixing this direct-acting guide 15 with springs to a fixing member 12m which will be described hereinafter is formed in the center portion on the outer side of the above linear bearing 13A.

Figure 3:
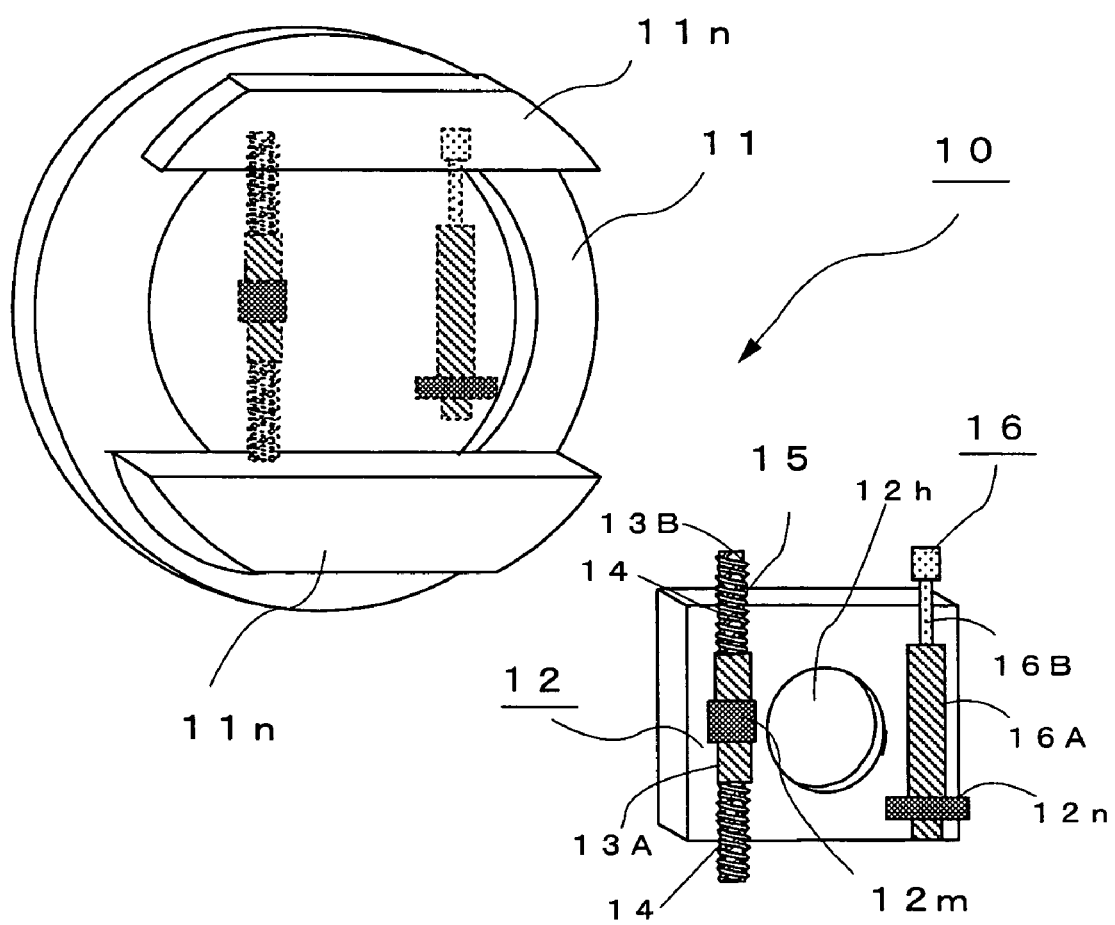
FIG. 3 is a diagram showing the constitution of a buffer mechanism according to the preferred embodiment.
Figure 4:
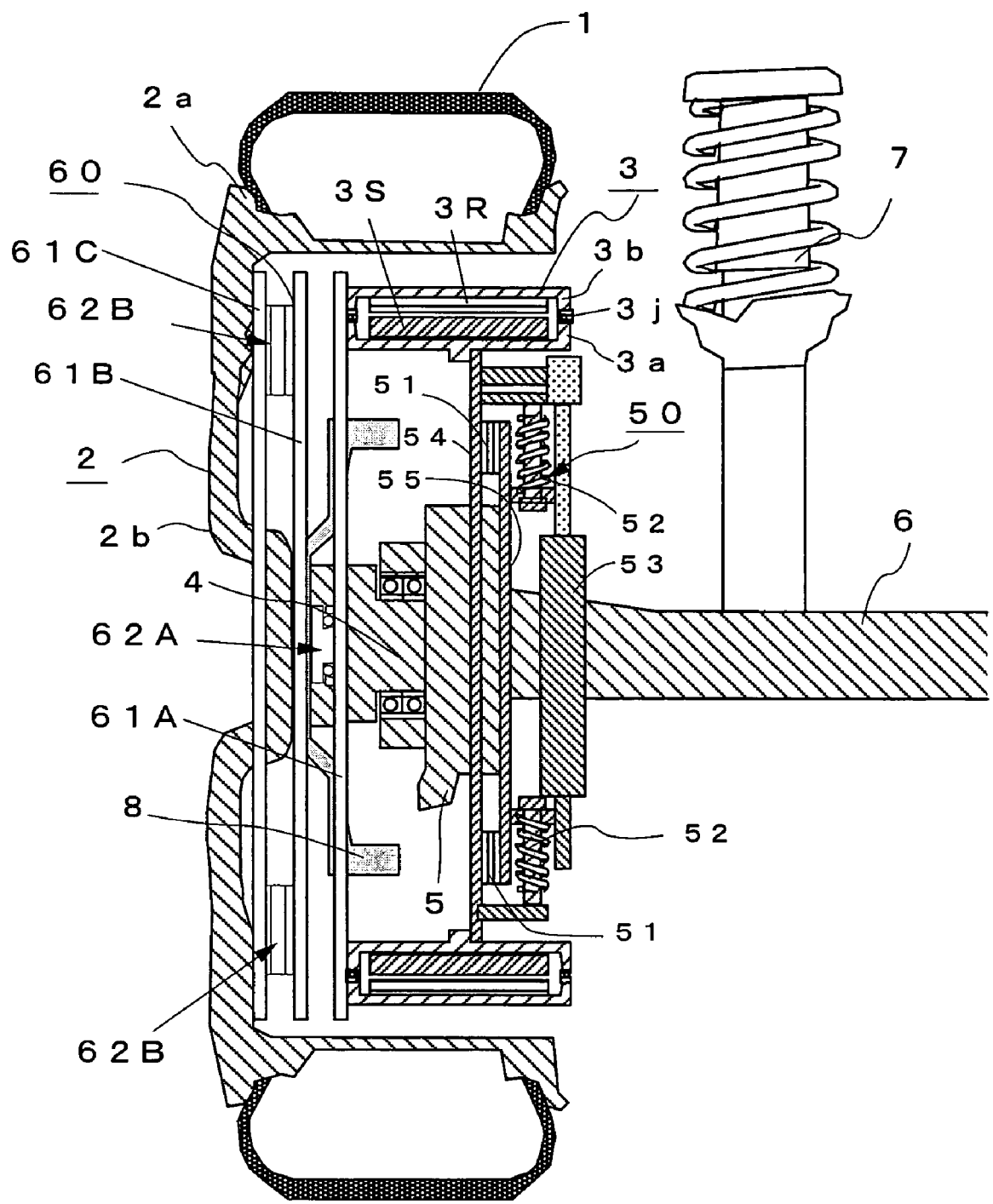
FIG. 4 is a diagram showing the constitution of a conventional in-wheel motor system of the prior art.
Figure 5:
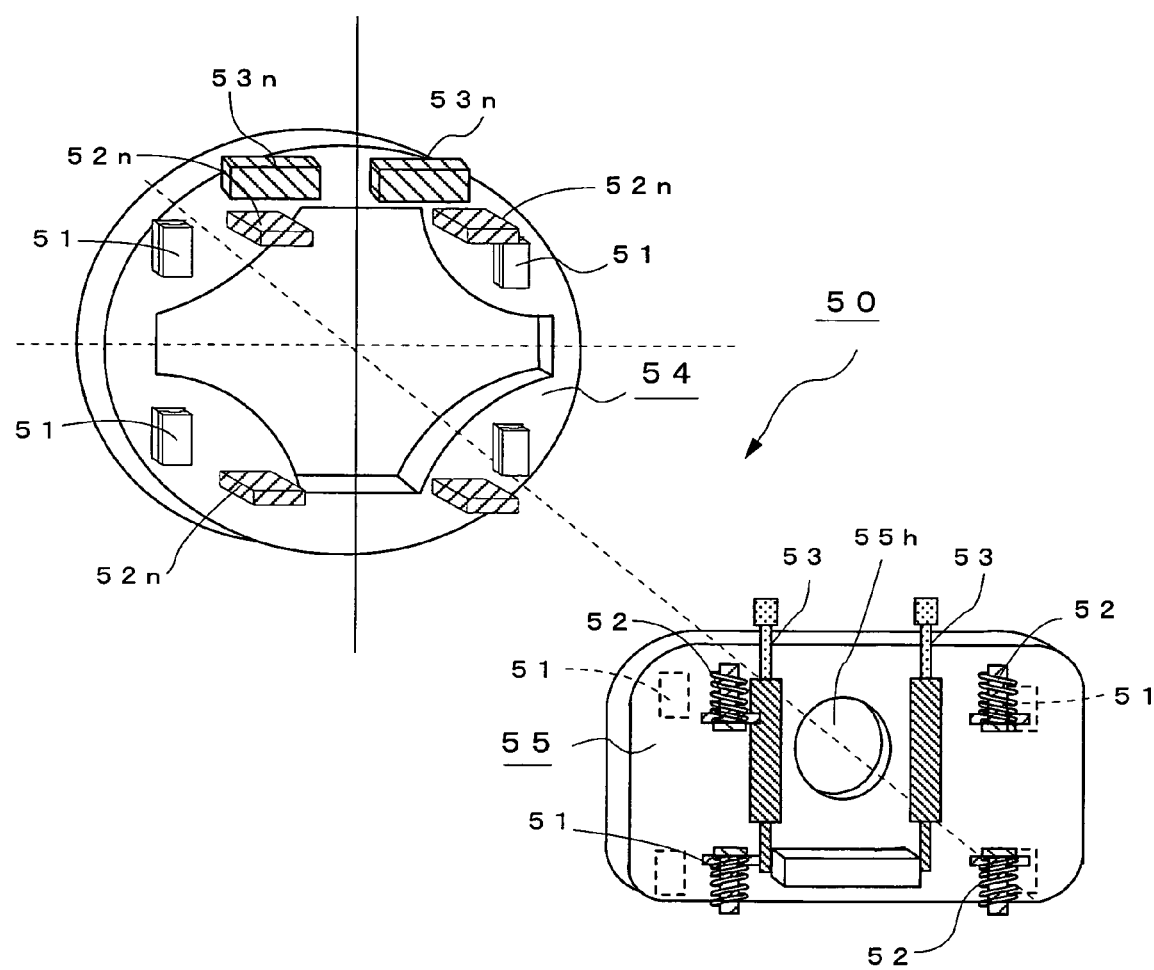
FIG. 5 is a diagram showing the constitution of a conventional buffer mechanism of the prior art.

In this embodiment, as shown in FIG. 3, the linear bearing 13A which is the fixing portion of the above direct-acting guide 15 with springs is fitted in the fixing member 12m mounted on one side of the connection hole 12h for the axle 6 formed in the knuckle attachment plate 12, and the fixing portion 16A of the damper 16 is fitted in a fixing member 12n mounted on the other side of the connection hole 12h. Receiving members 11n and 11n are installed at positions corresponding to the both end portions of the rod 13B which is the movable portion of the direct-acting guide 15 with springs on the motor attachment plate 11 on the motor 3 side, the both end portions of the above rod 13B are attached to the receiving members 11n and 11n, and the end of the movable portion 16B of the above damper 16 is attached to one of the above receiving members 11n. Since the above spring members 14 and 14 are arranged on the outer sides of the above rod 13B, they can be easily mounted in such a manner that they can expand and contract in the vertical direction of the vehicle, and the above direct-acting guide member 13 and the above spring members 14 and 14 can be installed between the motor attachment plate 11 and the knuckle attachment plate 12 at the same time.

Thereby, the above motor attachment plate 11 and the knuckle attachment plate 12 are guided in the vertical direction of the vehicle by the above direct-acting guide member 13 and interconnected by the spring members 14 and the damper 16, whereby the movement of the in-wheel motor 3 can be limited to the vertical direction while attenuation force is generated.

Thus, according to this embodiment, the non-rotating side case 3a of the motor 3 and the knuckle 5 are interconnected by the buffer mechanism 10 comprising the motor attachment plate 11 connected to the non-rotating side case 3a of the motor 3, the knuckle attachment plate 12 attached to the above axle 6, the direct-acting guide 15 with springs for connecting the above motor attachment plate 11 to the above knuckle attachment plate 12, which comprises the direct-acting guide 13 consisting of the linear bearing 13A and the rod 13B and spring members 14 and 14 moving in the vertical direction of the vehicle and integrated with the direct-acting guide 13, and the damper 16 moving in the vertical direction of the vehicle, for interconnecting the above plates 11 and 12, moving in the vertical direction of the vehicle. Therefore, the in-wheel motor 3 can be float mounted to the above part around the wheel of the vehicle with simple constitution. Consequently, as the motor 3 itself can be used as the weight of a dynamic damper, ground holding performance and riding comfort at the time of running on a bad road can be both improved. Since this buffer mechanism 10 has a small number of parts and is easily assembled, the work efficiency can be enhanced and productivity can be improved.

In the above embodiment, the buffer mechanism 10 comprising one direct-acting guide 15 with springs and one damper 16 has been described. The numbers and positions of the direct-acting guides 15 with springs and the dampers 16 are not limited and suitably determined according to the capacity and weight of the motor 3 or type of the suspension mechanism.

Not only the above one-rod type damper but also a known damper which expands and contracts in one direction may be used as the damper 16.

As having been described above, since the in-wheel motor is float mounted to a part around the wheel of a vehicle by using a buffer mechanism which has a small number of parts and is simple in structure, both ground holding performance and riding comfort at the time of running on a non-leveled road and assembly work efficiency can be enhanced. Therefore, productivity can be improved and the in-wheel motor can be manufactured at a low cost.

What is claimed is:

1. An in-wheel motor system having a hollow direct drive motor which is provided in a wheel and whose stator side is supported to a part around the wheel of a vehicle by elastic bodies and/or an attenuation mechanism, wherein
    a non-rotating side case of the motor is supported to the part around the wheel of the vehicle by a buffer mechanism which comprises a direct-acting guide with springs composed of a direct-acting guide member consisting of a linear bearing and a rod, and spring members integrated with the direct-acting guide, two plates interconnected by the direct-acting guide with springs in such a manner that their moving directions are limited to a vertical direction of the vehicle, and a damper for interconnecting the two plates, moving in the vertical direction.

2. The in-wheel motor system according to claim 1, wherein a fixing member for attaching the linear bearing as a fixing portion of the direct-acting guide is mounted on a knuckle attachment plate connected to a knuckle, receiving members for attaching both ends of the rod as a movable portion of the direct-acting guide are mounted on a motor attachment plate connected to the non-rotating side case of the motor, the fixing portion and the movable portion of the direct-acting guide are attached to the knuckle attachment plate and the motor attachment plate, respectively, and the spring members are interposed between the fixing member and the receiving member.

3. The in-wheel motor system according to claim 2, wherein the spring members are arranged on the outer sides of the rod.

* * * * *